(12) United States Patent
Huang (10) Patent No.: US 7,548,386 B2
(45) Date of Patent: Jun. 16, 2009

(54) MAGNIFYING GLASS WITH LIGHT FOR HANDHELD ELECTRONIC DEVICE

(75) Inventor: Tsung-Hui Huang, Taichung Hsien (TW)

(73) Assignee: Gem Optical Co., Ltd., Taiping (TW)

( * ) Notice: Subject to any disclaimer, the term of this patent is extended or adjusted under 35 U.S.C. 154(b) by 129 days.

(21) Appl. No.: 11/515,036

(22) Filed: Sep. 5, 2006

(65) Prior Publication Data

US 2008/0055745 A1    Mar. 6, 2008

(51) Int. Cl.
*G02B 27/02* (2006.01)
(52) U.S. Cl. .................... 359/802; 359/803
(58) Field of Classification Search .......... 359/802–817
See application file for complete search history.

(56) References Cited

U.S. PATENT DOCUMENTS 5,847,883 A * 12/1998 Rispoli, Sr. ................. 359/802
6,989,948 B2 * 1/2006 Hussaini et al. ............. 359/809
7,218,463 B1 * 5/2007 Arsenault ................... 359/817

* cited by examiner

*Primary Examiner*—Mohammed Hasan
(74) *Attorney, Agent, or Firm*—Bacon & Thomas, PLLC (57) ABSTRACT

A magnifying glass for magnifying a portable electronic device (e.g., PDA, or mobile phone) held by the hand is disclosed. In one embodiment the magnifying glass includes a spring-biased clamp adapted to fasten the thumb of either hand and having an extension; a light pivotably releasably secured to the extension; a pivotal member having one end pivotably secured to the extension; a hinge pivotably secured to the other end of the pivotal member; and two lenses each secured to the hinge. The number of lens is one with an elimination of the hinge and is pivotable clockwise or counterclockwise relative to the pivotal member in another embodiment. The single lens is slidable in a further embodiment.

3 Claims, 13 Drawing Sheets

MAGNIFYING GLASS WITH LIGHT FOR HANDHELD ELECTRONIC DEVICE

BACKGROUND OF THE INVENTION

1. Field of Invention

The invention relates to magnifying glasses and more particularly to such a magnifying glass mountable on the finger to magnify an electronic device (e.g., PDA (Personal Digital Assistant), mobile phone, or the like) held by the hand and illuminate same by means of a light thereof if such need arises.

2. Related Art

Many types of electronic device (e.g., PDAs, mobile phones, or the like) are characterized by being compact and portable. This also means that presentations (e.g., function keys of the electronic device) printed or shown thereon can be very small. This may cause difficulties in reading in operation especially for elderly people who typically have presbyopia. One typical method for overcoming the problem is that a person (e.g., an old person) may wear a pair of eyeglasses for presbyopia to clearly see what is shown or printed on the electronic device. However, it is inconvenient to store such eyeglasses on the pocket. Further, it is often that a person may forget to carry it on his pocket while outing. Furthermore, the eyeglasses tend to be damaged if it is not protected by a case when storing in the pocket. Thus, the need for improvement still exists.

SUMMARY OF THE INVENTION

It is therefore an object of the present invention to provide a magnifying glass device for magnifying an electronic device held by the hand, comprising a spring-biased clamp adapted to fasten the thumb of the hand and having an extension; a light pivotably releasably secured to the extension; a pivotal member having one end pivotably secured to the extension; a hinge pivotably secured to the other end of the pivotal member; and two lenses each secured to the hinge.

In one aspect of the present invention the extension comprises a first yoke including a recess, the pivotal member is a second yoke pivotably secured to the first yoke, and the hinge comprises a latch at one end slidably secured to the recess.

In another aspect of the present invention the pivotal member comprises a first universal joint at one end pivotably secured to the extension, and a second universal joint at the other end pivotably secured to the hinge.

It is another object of the present invention to provide a magnifying glass device for magnifying an electronic device held by the hand, comprising a spring-biased clamp adapted to fasten the thumb of the hand and including an extension having a first yoke; a light pivotably releasably secured to the extension; a second yoke pivotably secured to the first yoke and having a recess; a pivotal member including a latch at one end slidably secured to the recess; and a lens affixed to the other end of the pivotal member.

It is a further object of the present invention to provide a magnifying glass device for magnifying an electronic device held by the hand, comprising a spring-biased clamp adapted to fasten the thumb of the hand and including an extension having a first yoke; a light pivotably releasably secured to the extension; a pivotal member including a second yoke at one end pivotably secured to the first yoke, and a groove at the other end; and a lens including a projection slidably secured in the groove.

The above and other objects, features and advantages of the present invention will become apparent from the following detailed description taken with the accompanying drawings.

DETAILED DESCRIPTION OF THE INVENTION

Referring to FIGS. 1 to 4, a magnifying glass in accordance with a first preferred embodiment of the present invention comprises a pivotal adjustment assembly 10, a clamp 20, a hinge 30, two rectangular lenses 40, and a light 50. Each component is discussed in detailed below.

Figure 1:
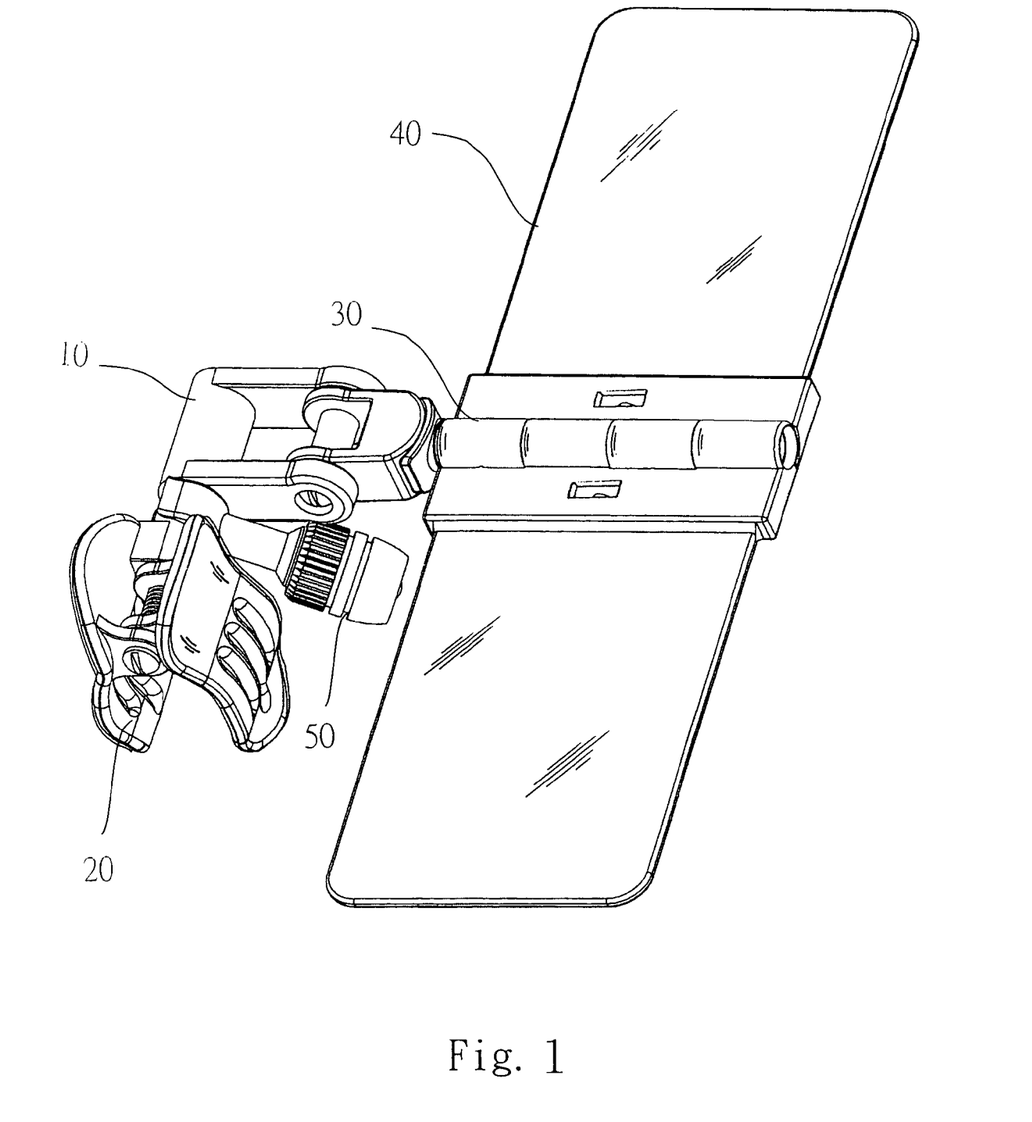
FIG. 1 is a perspective view of a first preferred embodiment of magnifying glass according to the present invention.
Figure 2:
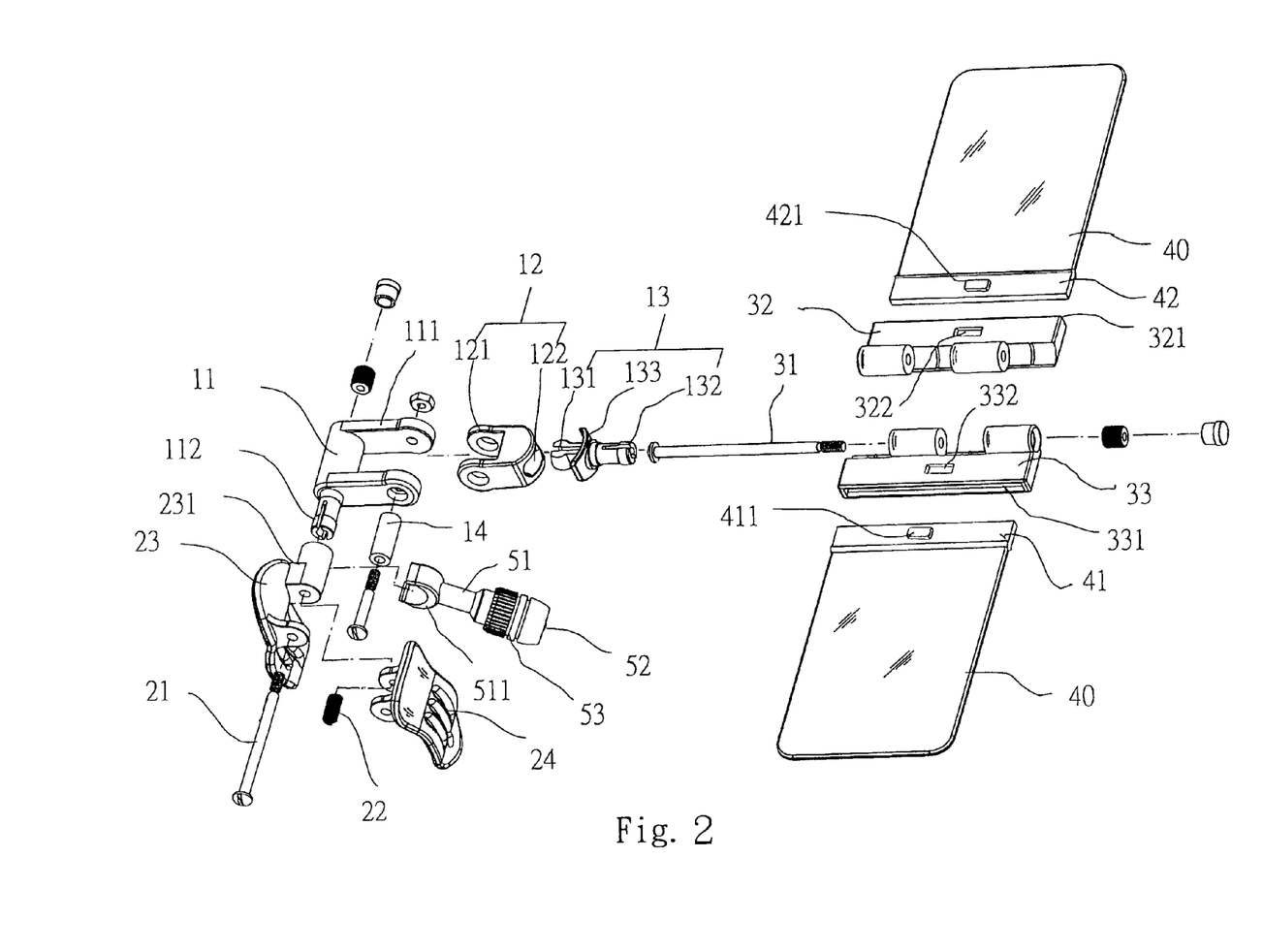
FIG. 2 is an exploded view of the magnifying glass.

The adjustment assembly 10 comprises a male yoke 11 including two yoke arms 111 and a split shaft 112 projected from a joining point of one yoke arm 111 and the main body of the male yoke 11; a female yoke 12 including two yoke arms 121 and an arcuate recess 122 at its main body; an elongate pivotal member 13 including a split latch 131 at one end pivotably fastened in the recess 122, an intermediate enlargement 133 fitted onto the recess 122, and a split shaft 132 at the other end; and a pin 14 for pivotably securing the male yoke 11 and the female yoke 12 together.

The clamp 20 comprises a first part 23 having a tube 231 put on the shaft 112, a second part 24, and a pin 21 inserted through two holed arms of the first part 23, a coil spring 22, and two holed arms of the second part 24 into the shaft 112 for assembling the clamp 20 and securing the clamp 20 and the adjustment assembly 10 together.

The light 50 comprises a cylindrical support 51 having a C-shaped yoke 511 at one end, the yoke 511 being pivotably releasably secured onto the tube 231, a lamp 52 at the other end of the support 1, an annular switch 53 having a knurled surface for ease of turning by the fingers, and one or more cells and associated wires (not shown) for supplying current to the lamp 52 when the switch 53 is in an on position.

The hinge 30 comprises a first hinge portion 32 including a groove 321 along one edge, a rectangular opening 322 in communication with the groove 321, and two spaced pipe-shaped hinge arms (not numbered); a second hinge portion 33 including a groove 331 along one edge, a rectangular opening 332 in communication with the groove 331, and two spaced pipe-shaped hinge arms (not numbered); and a hinge pin 31 having one end secured to the shaft 132 by insertion and the other end secured to one hinge arm of the second hinge portion 33 after inserting through the hinge arms of both first and second hinge portions 32 and 33.

Each of the lenses 40 comprises a fastening portion 41 or 42 at one end, the fastening portion 41 or 42 having a rectangular projection 411 or 421. One projection 421 is adapted to project out of the opening 322 for fastening one lens 40 and the first hinge portion 32 together. Likewise, the other projection 411 is adapted to project out of the opening 332 for fastening the other lens 40 and the second hinge portion 33 together. This finishes the assembly of the magnifying glass of the invention.

Figure 3:
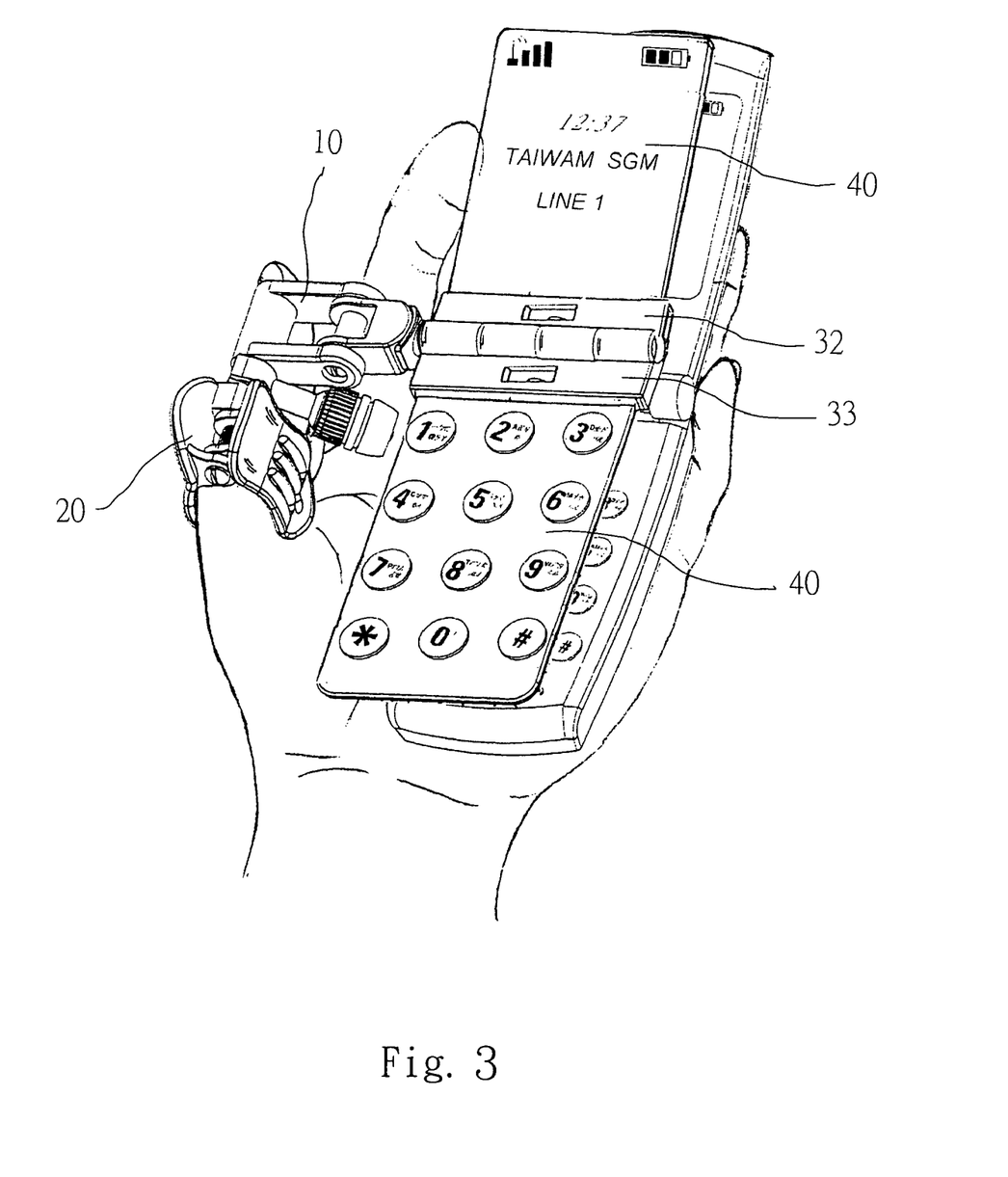
FIG. 3 is an environmental view of the magnifying glass being worn on the left hand with a mobile phone being held by the same hand.

Referring to FIG. 3 specifically, the thumb of the left hand is clamped by the clamp 20. A mobile phone in its open position is held by the palm of the left hand with the lenses 40 disposed above the open mobile phone. Thus, small keys of the mobile phone are magnified by one lens 40 and messages shown on a display of the mobile phone are magnified by the other lens 40.

Figure 4:
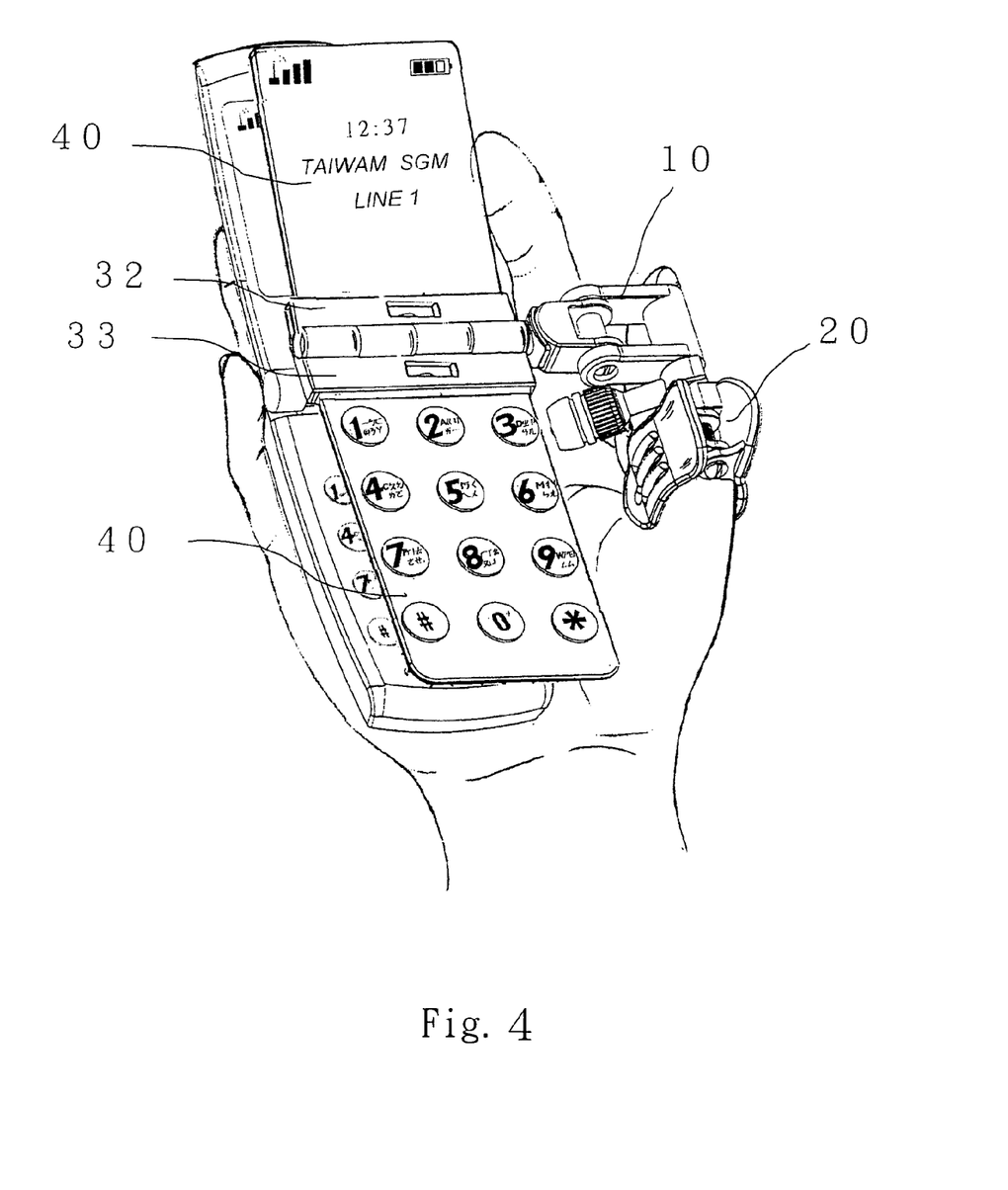
FIG. 4 is a view similar to FIG. 3 where the magnifying glass in another configuration being worn on the right hand with the mobile phone being held by the same hand.
Figure 5:
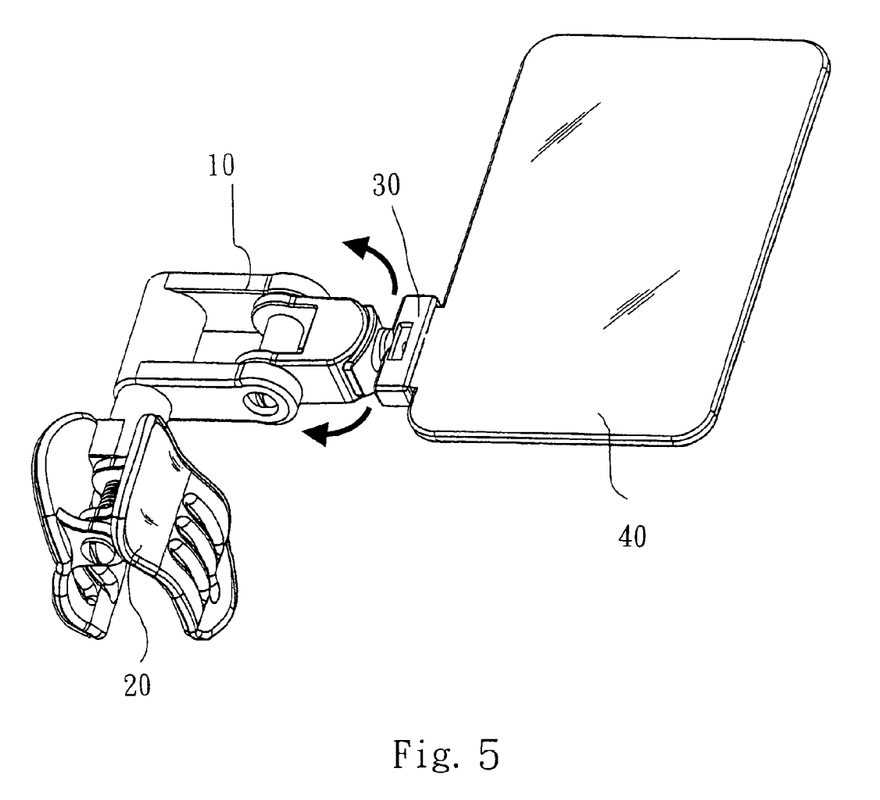
FIG. 5 is a perspective view of a second preferred embodiment of magnifying glass according to the present invention in which the number of lens is one.
Figure 6:
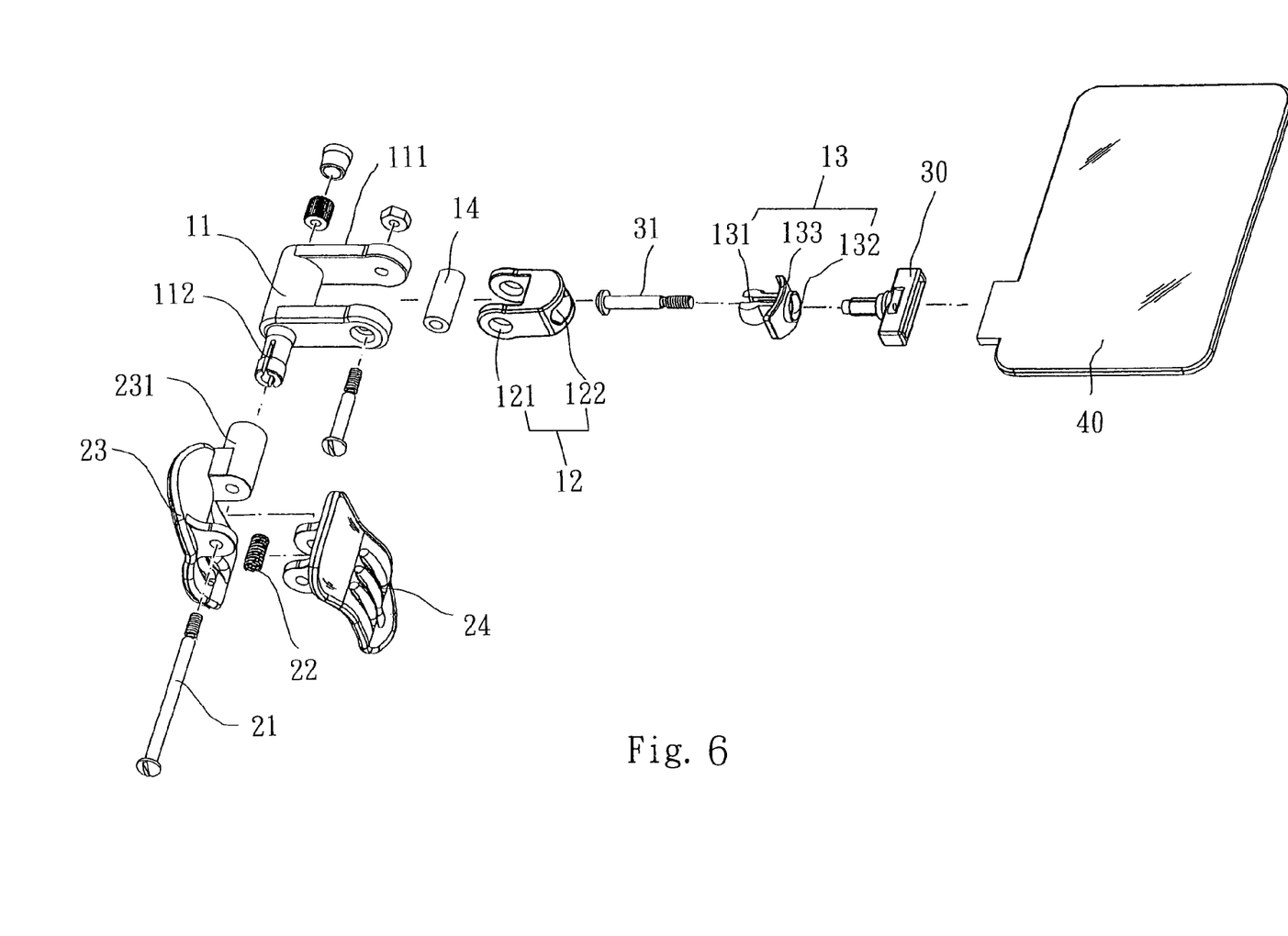
FIG. 6 is an exploded view of the magnifying glass of FIG. 5.
Figure 7:
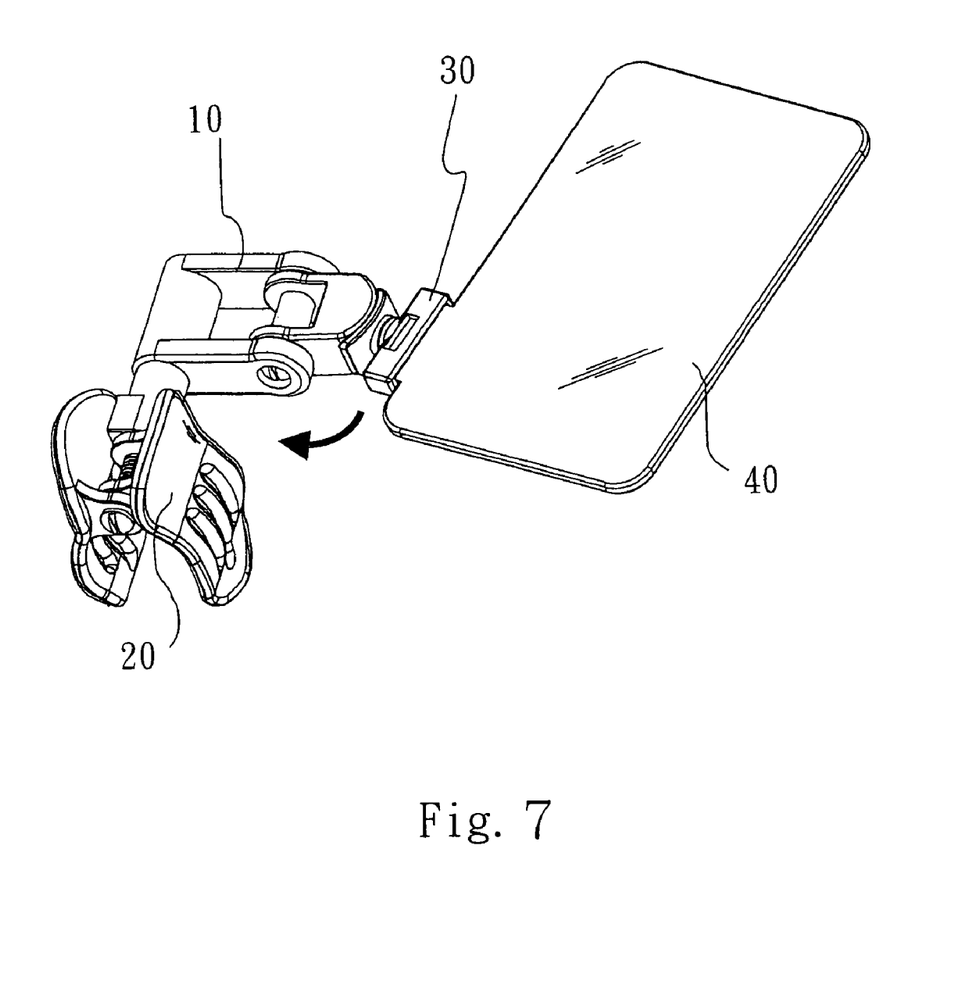
FIG. 7 is a view similar to FIG. 5 where the lens is pivoting clockwise.
Figure 8:
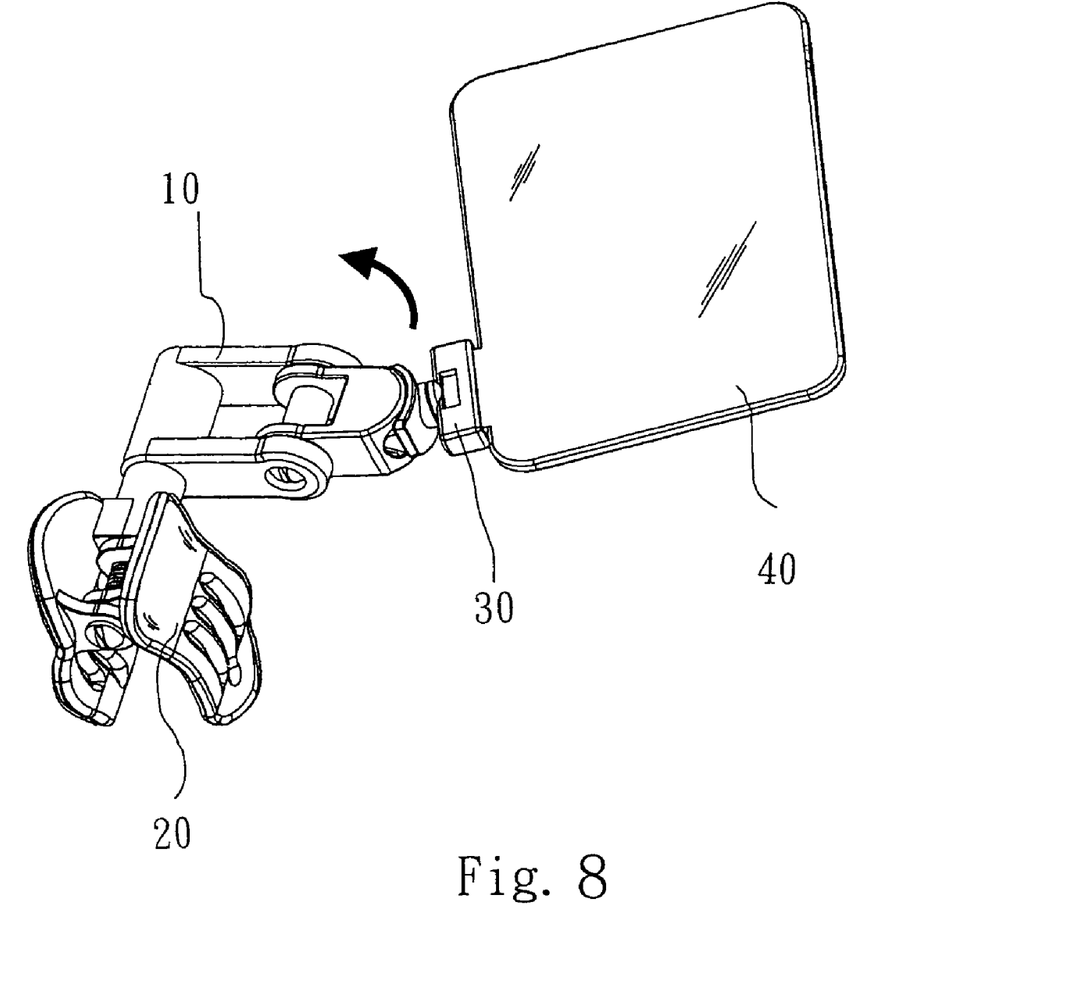
FIG. 8 is a view similar to FIG. 5 where the lens is pivoting counterclockwise.

Referring to FIG. 4 specifically, the magnifying glass is embodied in another configuration in which the adjustment assembly 10, the clamp 20, and the light 50 are assembled at the right hand side of the lenses 40 by means of the hinge 30. As shown, the thumb of the right hand is clamped by the clamp 20. A mobile phone in its open position is held by the palm of the right hand with the lenses 40 disposed above the open mobile phone. Thus, small keys of the mobile phone are magnified by one lens 40 and messages shown on a display of the mobile phone are magnified by the other lens 40.

Moreover, it is understood that the female yoke 12 is adapted to pivot about the male yoke 11. Further, the pivotal member 13 is adapted to pivot about the female yoke 12. Furthermore, an angle of one lens 40 relative to the other lens 40 can be adjusted by pivoting one lens 40 relative to the other lens 40 by utilizing their hinge connection (i.e., the hinge 30). All of the above operations are for adjustment. In addition, a person may turn on the light 50 and then adjust an angle of the light 50 relative to one lens 40 by pivoting the light 50 about the tube 231 until things magnified by one lens 40 are well illuminated. This operation is applicable to a dark environment.

Referring to FIGS. 5 to 8, a second preferred embodiment of the present invention is shown. The characteristics of the second preferred embodiment are detailed below. The number of the lens 40 is one. The hinge pin 31 is replaced by a pin 31. The hinge is replaced by a pivot member 30 having a rectangular cavity at one end fixedly connected to a rectangular projection formed at a left lower portion of the lens 40 and the other end shaped as a shank having internal threads inserted into the pivotal member 13. The pivotal member 13 is fastened at the recess 122. The pin 31 has its shank passed through the pivotal member 13 to threadedly secure in the other end of the pivot member 30 and its head pivotally anchored in the bottom of the recess 122. Thus, the lens 40, the pivot member 30, the pivotal member 13, and the pin 31 are secured together and they can pivot about the female yoke 12 at the recess 122. In detail, the lens 40 is adapted to pivot either clockwise (see FIG. 7) or counterclockwise (see FIG. 8).

Figure 9:
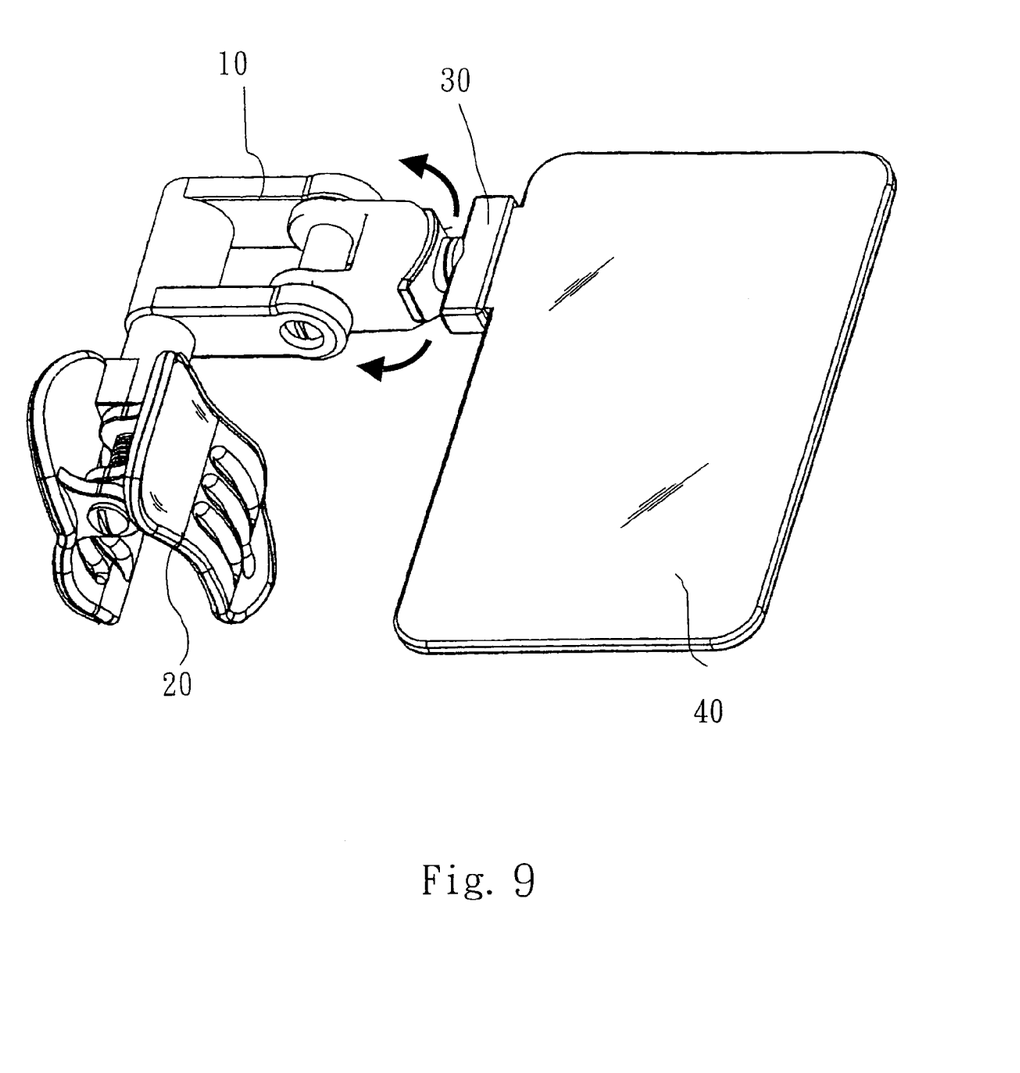
FIG. 9 is a perspective view of a third preferred embodiment of magnifying glass according to the present invention in which the number of lens is one.
Figure 10:
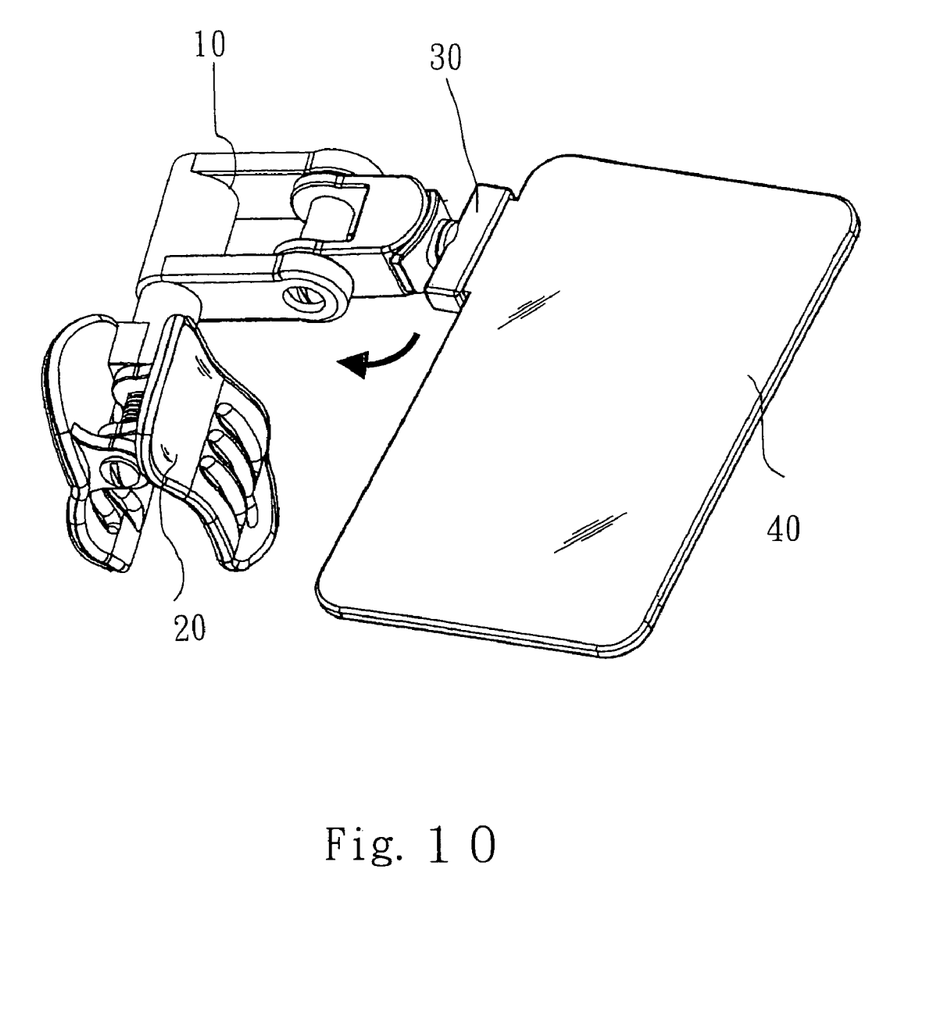
FIG. 10 is a view similar to FIG. 9 where the lens is pivoting clockwise.
Figure 11:
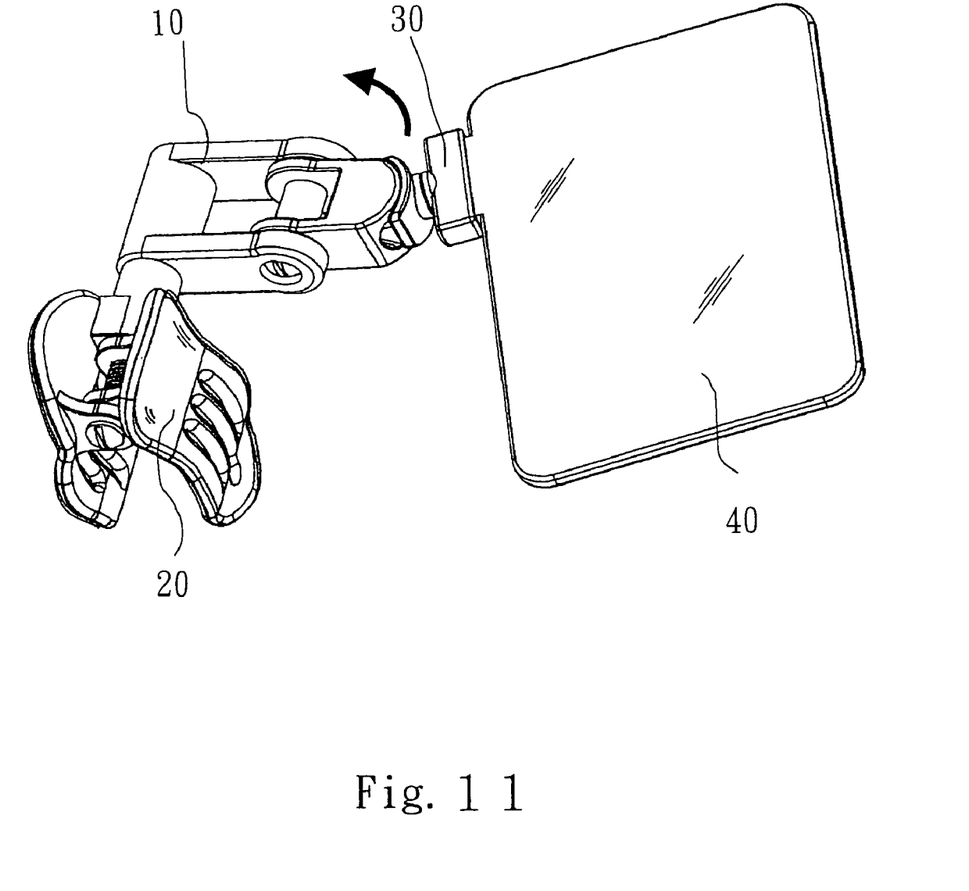
FIG. 11 is a view similar to FIG. 9 where the lens is pivoting counterclockwise.

Referring to FIG. 9 to 11, a third preferred embodiment of the present invention is shown. The third embodiment is identical to the second embodiment, except that the pivot member 30 has its rectangular cavity fixedly connected to a rectangular projection formed at a left upper portion of the lens 40. Similar to the second embodiment the lens 40 is adapted to pivot either clockwise (see FIG. 10) or counterclockwise (see FIG. 11).

Figure 12:
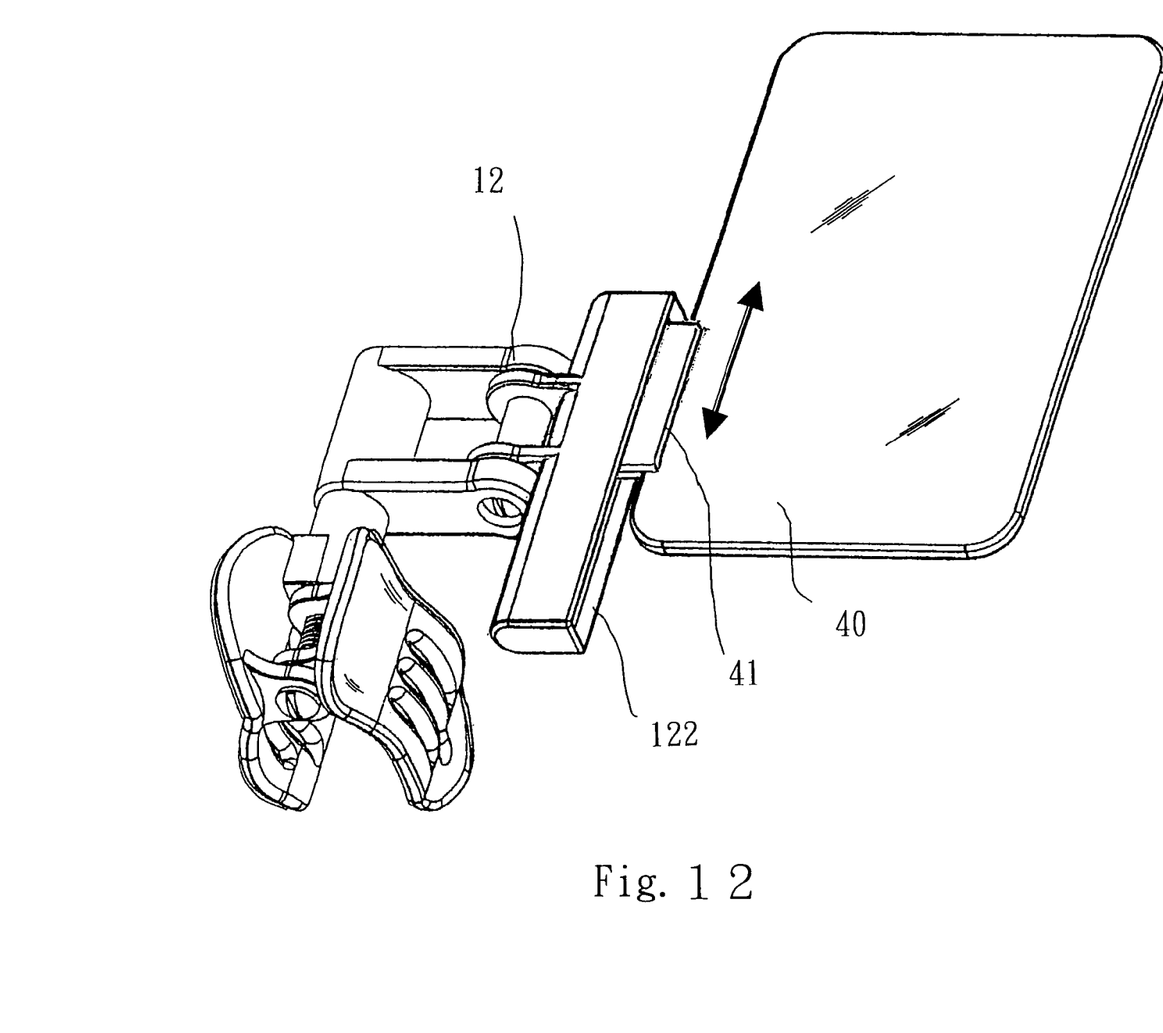
FIG. 12 is a perspective view of a fourth preferred embodiment of magnifying glass according to the present invention in which the number of lens is one and the lens is adapted to slide relative to the recess.

Referring to FIG. 12, a fourth preferred embodiment of the present invention is shown. The characteristics of the fourth preferred embodiment are detailed below. The number of lens 40 is one. The hinge, the female yoke, and the pivotal member are simplified as a unitary member. The fastening portion 41 is adapted to slide relative to the groove-shaped recess 122 of the unitary member.

Figure 13:
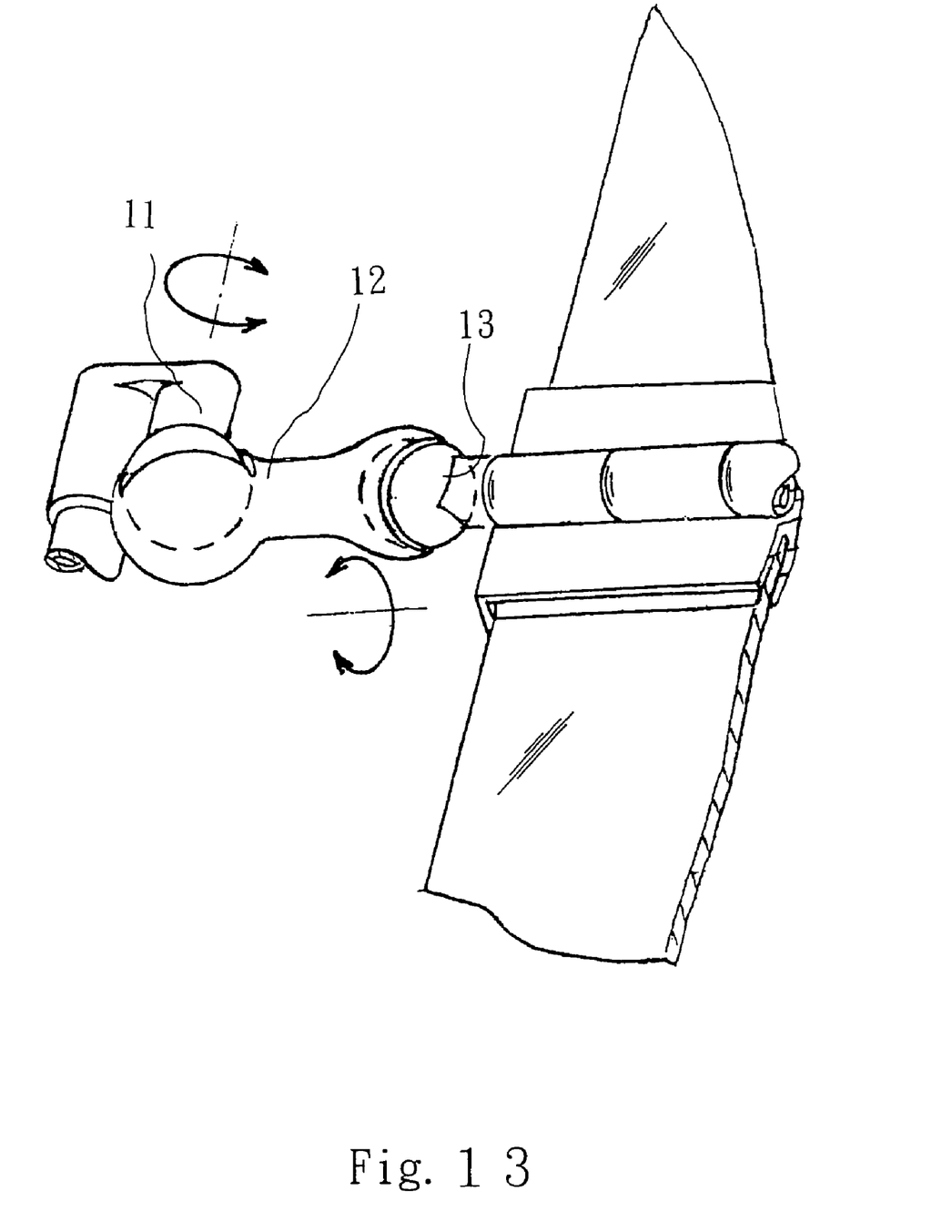
FIG. 13 is a perspective view of a fifth preferred embodiment of magnifying glass according to the present invention in which the two hingedly coupled lenses are connected to the adjustment assembly by means of two universal joints.

Referring to FIG. 13, a fifth preferred embodiment of the present invention is shown. The characteristics of the fifth preferred embodiment are detailed below. The male yoke 11 and the female yoke 12 are connected together by means of a universal joint. Also, the female yoke 12 and the hinge are connected together by means of another universal joint (i.e., the pivotal member) 13.

Advantages of the invention are described in detailed below. It is lightweight (e.g., about 27 g). It is compact and can be stored in the pocket. It is easy to use.

It is to be understood that the present invention is by no means limited only to the particular constructions herein disclosed and shown in the drawings, but also comprises any modifications or equivalents within the scope of the claims.

What is claimed is:

1. A magnifying glass device for magnifying a message display portion of an electronic device held by the hand, comprising:
   a spring-biased clamp adapted to secure to the thumb of the hand and having an extension;
   a light pivotably releasably secured to the extension;
   a pivotal member;
   a hinge having a hinge pin pivotably secured to both ends of the pivotal member; and
   two lenses pivotally joined together by the hinge;
   wherein the extension comprises a mating yoke, and the pivotal member is a corresponding mating yoke assembly pivotably secured to the mating yoke,
   wherein the corresponding mating yoke comprises a recess, and
   wherein the hinge comprises a latch at one end slidably secured to the recess.

2. A magnifying glass device for magnifying a message display portion of an electronic device held by the hand, comprising:
   a spring-biased clamp adapted to secure to the thumb of the hand and including an extension having a first yoke;
   a light pivotably releasably secured to the extension;
   a second yoke pivotably secured to the first yoke and having a recess;
   a pivotable member including a latch at one end slidably secured to the recess; and
   a lens affixed to the other end of the pivotal member.

3. A magnifying glass device for magnifying a message display portion of an electronic device held by the hand, comprising:
   a spring-biased clamp adapted to secure to the thumb of the hand and including an extension having a first yoke;
   a light pivotably releasably secured to the extension;
   a pivotal member including a second yoke at one end pivotably secured to the first yoke, and a groove at the other end; and
   a lens including a projection slidably secured in the groove.

* * * * *